United States Patent Office 2,844,071
Patented July 22, 1958

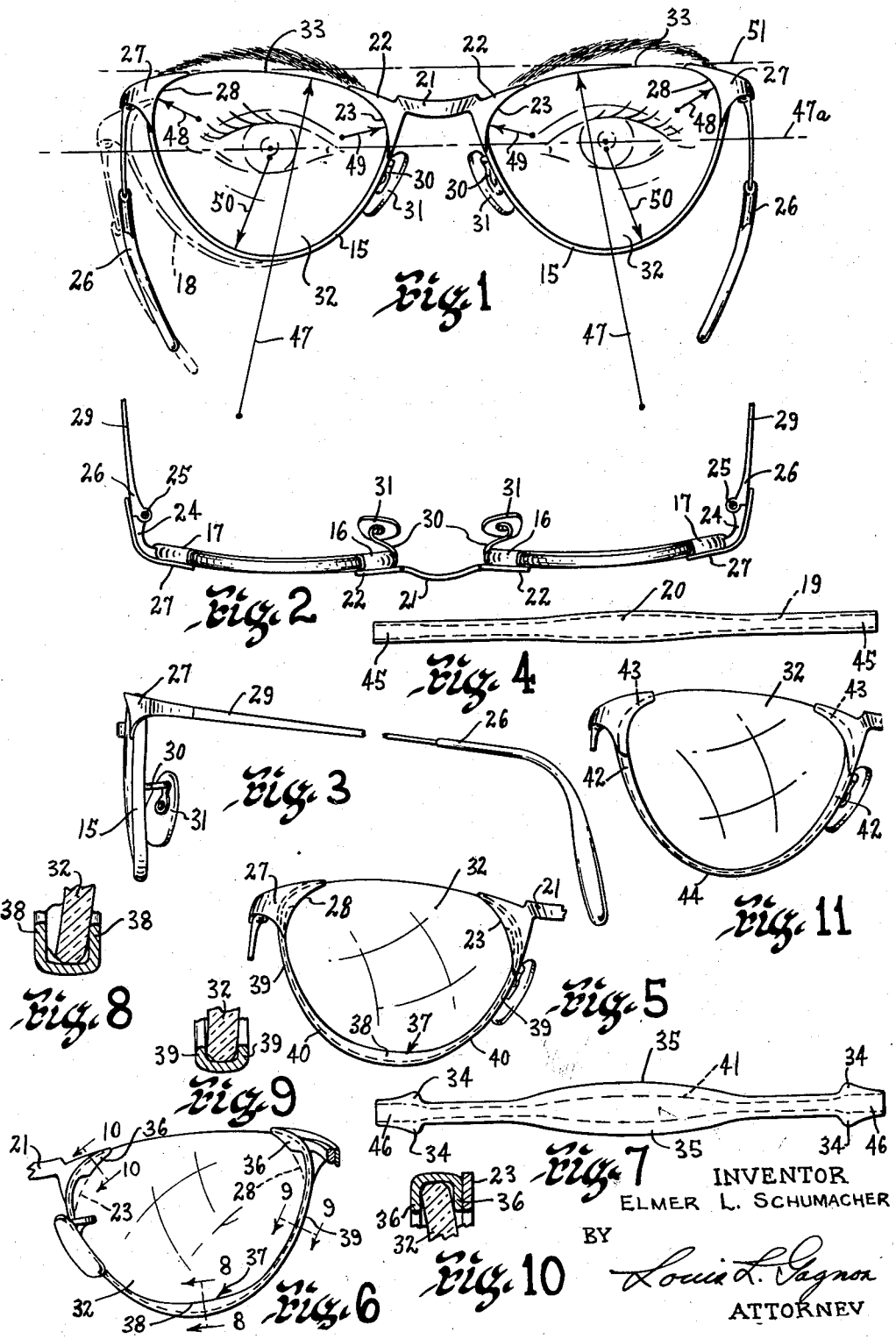

2,844,071

OPHTHALMIC MOUNTINGS

Elmer L. Schumacher, Southbridge, Mass., assignor to American Optical Company, Southbridge, Mass., a voluntary association of Massachusetts Application May 14, 1953, Serial No. 355,007

4 Claims. (Cl. 88—41)

This invention relates to improvements in ophthalmic mountings and has particular reference to the provision of a novel construction of mounting wherein the lenses may be readily removed from and positioned in assembled relation with the lens supporting structure of the mounting without the requirement of separate attachment means.

One of the principal objects of the invention is to provide an ophthalmic mounting of the above character having semi-rim portions shaped to have a yielding cradle-like gripping action with the lenses whereby the lenses may be readily removed from or positioned in assembled relation with said semi-rim portions without the requirement of separate attachment means.

Another object is to provide an ophthalmic mounting of the above character having a supporting frame structure which is such that the upper contour edges of the lenses are free from obstructions whereby the brows will be clearly visible and the resultant mounting will have a more desirable aesthetical effect when in position of use on the face.

Another object is to provide an ophthalmic mounting of the above character wherein the lenses may be assembled with the supporting structure of the mounting directly subsequent to the conventional edging of said lenses and without requiring special adjustment of the mounting.

Another object is to provide an ophthalmic mounting of the above character with which odd-shaped lenses having different base curves may be readily assembled without requiring adjustment of the mounting to accommodate for said different base curves.

Another object is to provide a novel construction of mounting of the above character wherein the lenses will be relieved from tortional strain which might result from flexing the temples when placing the mounting on or removing it from the face.

Another object is to provide a novel construction and mounting of the above character wherein the lenses will be more positively held in nested relation with the cradle-like lens supporting means.

Another object is to provide an ophthalmic mounting of the above character wherein the tension of the yielding gripping action of the cradle-like rim portions is positively controlled.

Another object is to provide a mounting of the above character which is readily susceptible to a wide variety of decorative treatment.

Other objects and advantages of the invention will become apparent from the following description taken in connection with the accompanying drawings and it will be apparent that many changes may be made in the details of construction and arrangement of parts shown and described without departing from the spirit of the invention as expressed in the accompanying claims. I, therefore, do not wish to be limited to the exact details of construction and arrangement of parts shown and described as the preferred forms only are given by way of illustration.

Referring to the drawings:

Fig. 1 is a front elevational view of a mounting embodying the invention;

Fig. 2 is a top plan view of the mounting illustrated in Fig. 1;

Fig. 3 is a side elevational view of the mounting;

Fig. 4 is a plan view of a rim section illustrating a step in the process of manufacture;

Fig. 5 is a fragmentary front elevational view of a modified form of the invention;

Fig. 6 is a rear elevational view of the modification illustrated in Fig. 5;

Fig. 7 is a view generally similar to Fig. 4 of the rim section utilized in the modification illustrated in Figs. 5 and 6;

Fig. 8 is a fragmentary enlarged sectional view taken as on line 8—8 of Fig. 6;

Fig. 9 is a sectional view generally similar to Fig. 8 taken as on line 9—9 of Fig. 6;

Fig. 10 is an enlarged fragmentary sectional view taken as on line 10—10 of Fig. 6; and Fig. 11 is a fragmentary front elevational view of a further modification of the invention.

It is generally known, particularly with women, that among the parts of the facial anatomy most considered from a cosmetic viewpoint are the eyebrows. It is believed that, as far as facial anatomy is concerned, most beauticians take into cognizance the cosmetic effect produced by the brows.

Perhaps one of the most desirable ophthalmic mountings, from the viewpoint of retaining the desired cosmetic effect of the brows, is the so-called prior art rimless type mountings.

Such mountings, however, in the past, were extremely fragile and the lenses thereof were readily susceptible to breakage because of the structural characteristics required in supporting the lenses before the eyes of the wearer.

Other mountings known as rim type spectacles employed rim portions completely surrounding the contour edges of the lenses with the result that part of the brows of the wearer were concealed by the rims and detracted from the resultant cosmetic effect desired of the brows.

Mountings of recent style trends are more undesirable in this respect in that they employ heavy zyl semi-rim portions which are shaped to follow the upper contour edges of the lenses in directly overlying and substantially completely concealing relation with the brows or if not in overlying relation therewith produced an undesirable double brow effect.

The present invention, therefore, is directed particularly to the provision of an ophthalmic mounting which overcomes all of the above difficulties through the provision of cradle-like lens supporting rim sections which have a yielding gripping action with the lenses in such manner that the upper contour edges of the lenses are free of obstructions and permit clear vision of the brows while affording maximum protection for the lenses.

Another feature of the present invention is that the lenses may be directly assembled with the lens supporting structure without requiring further treatment subsequent to the conventional edging thereof and will be supported in such a manner that no torsional strain will be directed thereto, as for example, might result from flexing the temple when placing the mounting on or removing it from the face.

Referring more particularly to the drawings wherein like characters of reference designate like parts throughout the several views, the mounting embodying the invention comprises a pair of cradle-like rim sections 15 shaped to follow the sides and lower contour edges of the lenses and to have portions overlying only a restricted portion of the upper nasal edge 16 and outer upper temporal edge 17 of the lenses. The rim portions 15, as shown throughout Figs. 1 through 4, are formed resilient and to have substantially the same yielding characteristics throughout the length thereof. This yielding characteristic is illustrated by the dash lines 18 in Fig. 1. The rim portions 15 are preformed to follow substantially the contour shape of the lenses when the lenses are positioned therein, as shown in Fig. 1, and are each provided with an inner channel 19 extending throughout the length thereof for receiving the contour edges of the lenses. Although the lens supporting rim portions 15 are preshaped to have an intimate fit and to follow the contour shapes of the lenses when the lenses are positioned therein, they are provided with an initial set wherein the distance between the nasal and temporal portions of the rim sections is initially less than the distance between the nasal and temporal edges of the lenses so that when the lenses are being positioned therein, the nasal and temporal edges of the rim portions have to be sprung outwardly against the inherent resiliency of said rim portions. This is to cause the rim portions to have the yielding cradle-like gripping and supporting action with the lenses to yieldingly hold them in desired assembled relation with the lenses.

It is particularly pointed out, by reference to Fig. 4, that the intermediate sections 20 of the channels 19 of the rim portions 15, which are to receive the lower contour edges of the lenses, are widened so as to readily accept lenses having different base curves or different degrees of cupping resulting from said base curves and that the more intimate gripping action of the rim portions with the lenses is throughout the nasal and temporal contour edge portions of the lenses.

Due to the fact that the rim portions are shaped to overlie a restricted section of the upper nasal and temporal edge portions of the lenses, the said lenses are more positively held against upward movement relative to and possible displacement from the rims. This arrangement, therefore, leaves the major portion of the upper contour edges of the lenses free from obstructions so that when the resultant mounting is in position of use on the face of the wearer, as diagrammatically illustrated in Fig. 1, the major portions of the brows of the wearer are clearly visible. The rim portions 15 are joined centrally by a bridge member 21 having shield-like end portions 22 shaped to overlie and to be secured to the upper nasal sections of the rims as by soldering or other suitable means. The bridge 21 and shield portions 22 are provided with controlled contour shapes according to the design characteristics desired and have contour edge portions 23 shaped substantially to the adjacent contour shapes of the rim portions.

Suitable endpieces 24 are secured to the temporal sides of the rim portions 15 as by soldering or other suitable means and are each provided with a temple hinge connection 25 to which suitable temples 26 are pivotally connected. The said temporal ends 17 of the rim portions 15 have shield-like members 27 secured thereto by soldering or the like and which are shaped to overlie the adjacent portions of the rims and the temporal endpieces 24, as shown best in Figs. 1, 2, and 3. The said shield members 27 are controlled in contour shape to introduce the design characteristics desired and have inner edge portions 28 shaped substantially to follow the contours of the adjacent rim portions. The said shield-like members 23 and 28, when in secured relation with the adjacent sections of the rim portions, form relatively rigid shape-retaining sections which are preshaped to follow and to have a relatively intimate fit with the adjacent portions of the contours of the lenses.

The bridge 21 may be formed either rigid or resilient as desired with the resiliency being controlled particularly to have its yielding characteristics disposed substantially only in a direction normal to the plane of the lenses. The adjacent side sections 29 of the temples are preferably formed resilient and yielding particularly in a horizontal direction whereby strain imparted to the temples as by spreading when placing the mounting on or removing it from the face of the wearer will prevent tortional strain from being directed to the rim portions. However, if such strain is directed to the rim portions, the lenses will be relieved therefrom due to the upper end portions of the rims having a substantially free rolling action in a direction transversely of the adjacent edges of the lenses. This is due to the fact that the upper end portions of the rims are free and merely have a yielding gripping action with the edges of the lenses by reason of the inherent resiliency of the rim portions. However, the temples either function independently or cooperatively with the resiliency of the bridge 21, when said bridge is formed resilient, to eliminate tortional strain from being directed to the lenses. The nasal sides of the rim portions have conventional nose pad supporting arms 30 secured thereto as by soldering or other suitable means and to which suitable nose pads 31 are either pivotally or rigidly attached.

It is pointed out that the lenses 32 are of the conventional full corrective field type and the upper contour edges 33 thereof are preferably shaped to curve in the direction of the curvature of the brows and to be positioned adjacent the brows.

In Figs. 5 through 10, there is shown a modification of the invention wherein the cradle-like rim portions, as shown particularly in Fig. 7, are provided with outwardly extending flared portions 34 and intermediate widened portions 34 and intermediate widened portions 35 which are subsequently bent to provide the rims with U-shaped cross-sections, as shown in Figs. 8 and 10. The flared portions 34 form lips 36 of increased area to overlie the opposed sides of the lens, as illustrated in Fig. 10 and the widened portions 35 form pocket-like portions 37 for receiving the lower edge of the lens. The said pocket-like portions have side walls 38 of increased width overlying the opposed adjacent edges of the lens, as illustrated in Fig. 8. These portions 36 and 38 increase the holding action of the rim portions with the lenses, that is, if the rim portions should be sprung slightly outwardly during the use of the mounting, the said lip portion 36 and wall portions 38 will prevent the lenses from being dislodged from the rim portions and will allow a free resilient gripping action of the rims with said lenses. It is particularly pointed out that the portions of the rims, in the vicinity of the pocket portions 37, are relatively rigid and that the side portions 39 are resilient or have a greater resiliency than the remaining portions of the rims. This, therefore, causes the resilient side portions 39 to have fulcrum points effectively located adjacent the opposed sides of the pocket-like portions 37 as indicated at points 40 when the said rim portions are spread or flexed outwardly to receive the lenses 32. Again, the shield portions 23 and 28 will cause the adjacent sections of the rim portions to be relatively rigid. It is further pointed out that the shield portions 23 and 28 are formed to overlie a portion of the adjacent area of the front surface of the lens to increase the gripping action of the rim portions with the lenses. In the construction shown particularly in Figs. 5 and 6, there are effectively three pocket portions of increased depth for increasing the holding action of the rims with the lenses and which result from the respective lip portions 36 and side wall portions 38. The channel which is formed inwardly of the rim sections, as shown by the dash lines 41 in Fig. 7, is similar to the channel formed in the rim section of Fig. 4, that is, it has a widened area throughout the portion thereof which is to overlie the lower contour edge of the lens to enable the rim sections to receive lenses of different base curves or lenses having different degrees of cupping without requiring bending or reshaping said rim sections. This obviates the necessity of having to bend the lower sections of the rim portions in order to accommodate for lenses of different base curves. The remaining construction of the mounting is similar to the mounting illustrated in Figs. 1 through 4 and which has been previously described above.

In Fig. 11, there is shown a further modification wherein the sides 42 and the upper ends 43 of the rim portions are formed with increased depth and more rigid than the lower intermediate resilient section 44 and in which instance the flexing of said rim portions will take place substantially only throughout said lower section when the lenses 32 are being positioned in said rim portions. This construction provides pocket-like portions of increased depth throughout the opposed sides of the lenses and which function in a manner similar to the pocket-like portions 36 and 38 to aid in preventing the lenses from being accidentally dislodged from the rim portions.

It is pointed out that the lower sections of the rim portions in all of the various constructions set forth above are widened, as illustrated in Fig. 8, to accommodate for lenses having different base curves or cuppings and the nasal and temporal side sections of said rim portions have a relatively intimate fit with the adjacent contour edges of the lenses, as illustrated in Fig. 9.

It is further pointed out, by reference to Fig. 10, that the channel 19 or 41, as the case may be, is slightly wider throughout the upper inwardly extending portions 16 and 17 on the nasal and temporal sides thereof and do not have as intimate a fit with the adjacent contour edges of the lenses as the nasal and temporal sections of said rim portions. This is to permit the rims to have greater freedom to roll in a direction transversely of the adjacent edges of the lenses if tortional strain is directed to said adjacent rim portions as, for example, may result from flexing the temples outwardly when placing the mounting on or removing it from the face. This slight increasing of the width of the rims is shown at 45 in Fig. 4 and at 46 in Fig. 7.

However, in instances when the bridge is formed resilient and the temples are also formed resilient, as set forth above, the widening of the channels, as illustrated at 45 and 46, will not be necessary. The shapes of the channels and the rim portions, as shown in Figs. 4 and 7, are controlled during the fabrication of said rim portions and are preferably formed to the contour configurations desired from flat metal stock and in which the channels are formed by striking and bending the opposed longitudinal edges of the flat metal stock to the cross-sectional shapes desired, as shown in the various enlarged sectional views.

Although only one particular contour shape of lens has been shown and described, it is to be understood that several different contour shapes might be used while retaining the general structural characteristics desired, it being understood, of course, that the cradle-like rim portions are preshaped to fit such different contour shapes. In all instances, however, the lenses will be of the conventional full field type as contrasted with the half lens reading type of the prior art and which had their upper edge portions located below or adjacent the line of straight-ahead vision of the eyes. The endpieces and bridge of the present mounting are positioned above a horizontal line 47a extending through the optical centers or points on the lenses through which the lines of straight-ahead vision of the eyes pass and have the major portions thereof located between said line 47a and a line parallel thereto and tangent with the upper edges of the lenses whereby these portions of the mounting are located above the most useful field of vision. This is particularly true of the temples and endpieces which are located above the useful field of side vision. The lenses are intentionally formed to the conventional full field type so that the upper contour edges 33 thereof are located adjacent and are shaped to follow substantially the shape of the brow line of the wearer and thereby permits the bridge and temple endpieces to be located above the most useful field of vision while leaving the upper contour edges of the lenses free from obstructions to permit clear vision of the eyebrows.

Although the rim portions 15 are shown in Figs. 5 and 6 as having relatively long deep pocket-like portions 38, it is to be understood that narrow outwardly extending lip portions bent to have cross-sectional dimensions similar to that illustrated in Fig. 8 might be formed intermediate the lower sections of the rims.

In all of the different constructions of mountings set forth above, the resiliency of the cradle-like rim portions is so controlled as to cause said rim portions to properly grip and hold the lenses during the use of the mounting while permitting said lenses to be readily positioned in or removed from the rims during the initial fabrication of the mounting or when replacement or interchanging of lenses is required.

It is particularly pointed out, as shown in Fig. 1, that the lenses 32 are provided with upper edges 33 having a relatively long arc of curvature 47 which blend into relatively short radii of curvatures 48 and 49 adjacent the upper temporal and nasal edge portions of the lenses and have their lower contour shapes of an intermediate radius of curvature 50 which is substantially twice that of the radii of curvatures 48 and 49. The lower curved portions of the lenses are joined with the relatively short radii of curvatures 48 and 49 by arcs of relatively long radii to produce continuously blending contours.

The rim portions 15 are preshaped to fit the respective contour portions of the lenses and to have upper nasal and temporal end portions 16 and 17 shaped to overlie and to follow the shape of the adjacent arcs of curvatures 48 and 49. These end portions 16 and 17 terminate adjacent the points of blending of said arcs 48 and 49 with the arcs of curvature of the upper edge portions 33 and provide overhanging means for more positively retaining the lenses in desired assembled relation with said cradle-like rim portions.

It is particularly pointed out that the major portion of the temporal ends 17 of the rims lie below a line 51 substantially parallel with the horizontal axial line 47a and which is tangent with the uppermost edge portions of the lenses. The upper nasal portions 16 lie considerably below the line 51 and function cooperatively with the upper temporal portion 17 to have the desired gripping action with the lenses and also to leave the major portion of the upper edges 33 thereof free and unobstructed.

While the rim portions 15 are preshaped to fit rather intimately with the contour portions of the lenses which are positioned therein, the said rims do have an initial set whereby the nasal and temporal portions are spaced apart a distance considerably less than the width of the lenses and do require being flexed outwardly to receive the lenses when the said lenses are being positioned therein.

Due to the fact that the rims are preshaped to assume an intimate fit with the lenses, they permit the lenses to be assembled therewith directly subsequent to the conventional edging thereof to the final shape and size desired and without the requirement of separate attachment means.

The semi-rim portions or sections are preformed dimensionally to the adjacent shape of the lenses, as set forth above, and to have a relatively intimate fit with said lenses throughout the major portion of the length of the sides of the rim sections to hold said lenses against possible tilting movement relative to said rim sections during the use of the mountings. It is further pointed out that the upper end portions 16 and 17 of the rim sections are disposed in divergent relation with the side portions of said rim sections whereby the lenses will seat in a more positive nested relation with the rim sections when placed therein and to enable said rim sections to have a more positive cradle-like gripping action with said lenses.

The spaced pocket-like portions 36 and 38 of increased depth will function to aid in preventing the lenses from being dislodged from or from dropping out of said rim sections in instances when the rim sections might momentarily be accidentally sprung outwardly a limited amount away from the adjacent contour edges of the lenses and provide for a more positive seating of the lenses with said rim sections.

The above conditions exist in all of the various different modifications which have been shown and described.

Although the lower contours of the lenses have been shown as being curved, it is to be understood that they may be formed to other desired shapes.

From the following description, it will be seen that simple, efficient and economical means have been provided for accomplishing all of the objects and advantages of the invention.

Having described my invention, I claim:

1. An ophthalmic mounting for use with a pair of lenses having their upper contour edge portions curved to arch upwardly and assume a position adjacent the eyebrows of the wearer and having their remaining edge portions of a controlled contour shape and size to provide a maximum field of corrective vision through said lenses, said mounting having a pair of partial metallic rim sections formed of strips of flat resilient sheet stock bent in a transverse direction to form a longitudinal channel inwardly of said sections and each being shaped to follow the sides and the lower contour edges of their respective lens, said rim sections being of a resiliency such as to have a cradle-like gripping action with the lenses and having integrally curved end portions on the nasal and temporal sides thereof of the same cross-sectional shape as the intermediate portions of said rim sections and being shaped to follow the adjacent edges of the lenses and to overlie only a restricted area of the upper nasal and temporal edge portions of the lenses to hold said lenses against displacement upwardly with respect to said rim sections, a bridge member connecting the nasal sides of said rim sections and having relatively large flat end portions shaped to overlie only a side surface of said integral curved end portions of said rim sections on the nasal sides thereof and secured to said curved end portions to render them relatively rigid and shape-retaining, temple endpieces on the upper temporal sides of said rim sections having relatively large flat end portions overlying only a side surface of the curved temporal end portions of said rim sections and secured thereto to render said end portions relatively rigid and shape-retaining, the major portion of said bridge and temple endpieces being located to lie above a horizontal line extending through the lines of straight-ahead vision of the eyes of the wearer through the lenses when the mounting is in position of use on the face, and the upper contour edges of the lenses intermediate said upper integrally curved end portions on the nasal and temporal sides of the lenses being free from obstructions whereby the major portion of the eyebrows of the wearer will be visible when the mounting is viewed from the front.

2. An ophthalmic mounting for use with a pair of lenses having their upper contour edge portions curved to arch upwardly and assume a position adjacent the eyebrows of the wearer and having their remaining edge portions of a controlled contour shape and size to provide a maximum field of corrective vision through said lenses, said mounting having a pair of partial metallic rim sections formed of strips of flat resilient sheet stock bent in a transverse direction to form a longitudinal channel inwardly of said sections and each being shaped to follow the sides and the lower contour edges of their respective lens, said rim sections being of a resiliency such as to have a cradle-like gripping action with the lenses and having integrally curved end portions on the nasal and temporal sides thereof of the same cross-sectional shape as the intermediate portions of said rim sections and being shaped to follow the adjacent edges of the lenses and to overlie only a restricted area of the upper nasal and temporal edge portions of the lenses to hold said lenses against displacement upwardly with respect to said rim sections, a bridge member connecting the nasal sides of said rim sections and having relatively large flat end portions shaped to overlie only a side surface of said integral curved end portions of said rim sections on the nasal sides thereof and secured to said curved end portions to render them relatively rigid and shape-retaining, temple endpieces on the upper temporal sides of said rim sections having relatively large flat end portions overlying only a side surface of the curved temporal end portions of said rim sections and secured thereto to render said end portions relatively rigid and shape-retaining, said rim sections having an initial set such that the distance between the curved end portions on the nasal and temporal ends thereof will be less than the width of the upper portions of the lenses and being simultaneously controlled in shape so as to closely follow the adjacent contour shapes of the lenses when fitted thereon, the major portion of said bridge and temple endpieces being located to lie above a horizontal line extending through the lines of straight-ahead vision of the eyes of the wearer through the lenses when the mounting is in position of use on the face, and the upper contour edges of the lenses intermediate said upper integrally curved end portions on the nasal and temporal sides of the lenses being free from obstructions whereby the major portion of the eyebrows of the wearer will be visible when the mounting is viewed from the front.

3. An ophthalmic mounting for use with a pair of lenses having their upper contour edge portions curved to arch upwardly and assume a position adjacent the eyebrows of the wearer having their remaining edge portions of a controlled contour shape and size to provide a maximum field of corrective vision through said lenses, said mounting having a pair of partial metallic rim sections formed of strips of flat resilient sheet stock bent in a transverse direction to form a longitudinal channel inwardly of said sections and each being shaped to follow the sides and the lower contour edges of their respective lens, said rim sections being of a resiliency such as to have a cradlelike gripping action with the lenses and having integrally curved end portions on the nasal and temporal sides thereof shaped to follow the adjacent edges of the lenses and to overlie only a restricted area of the upper nasal and temporal edge portions of the lenses to hold said lenses against displacement upwardly with respect to said rim sections, the channel in said portions shaped to overlie only said restricted areas being of a width greater than the thickness of said adjacent edge portions of the lenses, a bridge member connecting the nasal sides of said rim sections and having relatively large flat end portions shaped to overlie only a side surface of said integral curved end portions of said rim sections on the nasal sides thereof and secured to said curved end portions to render them relatively rigid and shape-retaining, said bridge having its central portion resilient and free to flex only in a direction normal to the plane of the lenses, temple endpieces on the upper temporal sides of said rim sections having relatively large flat end portions overlying only a side surface of the curved temporal end portions of said rim sections and secured thereto to render said end portions relatively rigid and shape-retaining, temples secured to said temple endpieces having an intermediate resilient portion shaped to flex only in the direction of the horizontal axes of the lenses when the temples are in position of use, the major portion of said bridge and temple endpieces being located to lie above a horizontal line extending through the lines of straight-ahead vision of the eyes of the wearer through the lenses when the mounting is in position of use on the face, and the upper contour edges of the lenses intermediate said upper integrally curved end portions on the nasal and temporal sides of the lenses being free from obstructions whereby the major portion of the eyebrows of the wearer will be visible when the mounting is viewed from the front.

4. An ophthalmic mounting for use with a pair of lenses having their upper contour edge portions curved to arch upwardly and assume a position adjacent the eyebrows of the wearer and having their remaining edge portions of a controlled contour shape and size to provide a maximum field of corrective vision through said lenses, said mounting having a pair of partial metallic rim sections formed of strips of flat resilient sheet stock bent in a transverse direction to form a longitudinal channel inwardly of said sections and each being shaped to follow the sides and the lower contour edges of their respective lens, said rim sections being of a resiliency such as to have a cradle-like gripping action with the lenses and having integrally curved end portions on the nasal and temporal sides thereof of a depth greater than the depth of the adjacent side portions of said rim sections and being shaped to follow the adjacent edges of the lenses and to overlie only a restricted area of the upper nasal and temporal edge portions of the lenses to form relatively deep pocket portions to hold said lenses against displacement upwardly and sidewise with respect to said rim sections, a bridge member connecting the nasal sides of said rim sections and having relatively large flat end portions shaped to overlie only a side surface of said integral curved end portions of said rim sections on the nasal sides thereof and secured to said curved end portions to render them relatively rigid and shape-retaining, temple end-pieces on the upper temporal sides of said rim sections and having relatively large flat end portions overlying only a side surface of the curved temporal end portions of said rim sections and secured thereto to render said end portions relatively rigid and shape-retaining, the channel in the lower portions of said rim sections being wider than the width of the channels in the side portions of said rim sections to permit ready assemblge of lenses of different base curves and having different degrees of cupping without requiring bending and reshaping of said lower portions of the rims, the major portion of said bridge and temple endpieces being located to lie above a horizontal line extending through the lines of straight-ahead vision of the eyes of the wearer through the lenses when the mounting is in position of use on the face, and the upper contour edges of the lenses intermediate said upper integrally curved end portions on the nasal and temporal sides of the lenses being free from obstructions whereby the major portion of the eyebrows of the wearer will be visible when the mounting is viewed from the front.

References Cited in the file of this patent

UNITED STATES PATENTS

| | | |
|---|---|---|
| 836,147 | Scudder et al. | Nov. 20, 1906 |
| 1,086,802 | Beebe | Feb. 10, 1914 |
| 2,112,644 | Bausch | Mar. 29, 1938 |
| 2,254,746 | Line | Sept. 2, 1941 |
| 2,574,896 | Tanis | Nov. 13, 1951 |
| 2,585,352 | Silverman | Feb. 12, 1952 |
| 2,627,783 | Splaine | Feb. 10, 1953 |

FOREIGN PATENTS

| | | |
|---|---|---|
| 464,718 | Italy | July 20, 1951 |
| 689,997 | Great Britain | Apr. 8, 1953 |